(12) United States Patent
Lu

(10) Patent No.: US 11,647,173 B2
(45) Date of Patent: May 9, 2023

(54) ELECTRONIC DEVICE AND METHOD FOR CHANGING MODES VIA MULTIPLE DISPLAYS

(71) Applicants: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)

(72) Inventor: Kun-Da Lu, Guangdong (CN)

(73) Assignees: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)

( * ) Notice: Subject to any disclaimer, the term of this patent is extended or adjusted under 35 U.S.C. 154(b) by 143 days.

(21) Appl. No.: 17/184,615

(22) Filed: Feb. 25, 2021

(65) Prior Publication Data

US 2022/0247988 A1     Aug. 4, 2022

(30) Foreign Application Priority Data

Feb. 3, 2021   (CN) .......................... 202110148216.2

(51) Int. Cl.
*H04N 13/111*     (2018.01)
*H04N 13/302*     (2018.01)
(Continued)

(52) U.S. Cl.
CPC .......... *H04N 13/111* (2018.05); *G09G 3/035* (2020.08); *H04N 13/302* (2018.05);
(Continued)

(58) Field of Classification Search
CPC .............. H04N 13/111; H04N 13/302; H04N 13/266; H04N 2213/001; G09G 3/035; G09G 2354/00
See application file for complete search history.

(56) References Cited

U.S. PATENT DOCUMENTS

2008/0246722 A1\* 10/2008 Tsuzaki ................. G06F 3/0412
345/104
2010/0279739 A1\* 11/2010 Lin ..................... H04M 1/0202
455/566

(Continued)

FOREIGN PATENT DOCUMENTS

| CN | 103176644 A | * | 6/2013 | ........... G06F 1/1605 |
| CN | 105980976 A | * | 9/2016 | ........... G06F 1/1605 |
| CN | 210038600 U | * | 2/2020 | |

*Primary Examiner* — Terrell M Robinson
(74) *Attorney, Agent, or Firm* — CKC & Partners Co., LLC

(57) ABSTRACT

An electronic device includes a transparent first display panel, a second display panel and a processor electrically connected to the two panels. The first display panel is movable with respect to the second display panel. The processor is configured to switch between a plurality of display modes based on relative positioning of the two panels and to provide video signals to the two panels based on a current display mode. When the first display panel is parallel to the second display panel and faces a display area of the second display panel, the processor executes a stereoscopic display mode. When an angle between the two panels is between 0 and 180 degrees, exclusive, the processor executes an augmented reality display mode. When the display areas of the two panels are oriented away from each other, the processor executes a dual display mode.

17 Claims, 14 Drawing Sheets

(51) Int. Cl.
 *H04N 13/366* (2018.01)
 *G09G 3/00* (2006.01)
(52) U.S. Cl.
 CPC ....... *H04N 13/366* (2018.05); *G09G 2354/00* (2013.01); *H04N 2213/001* (2013.01)

(56) References Cited

U.S. PATENT DOCUMENTS

| | | | |
|---|---|---|---|
| 2014/0253490 A1* | 9/2014 | Sumi | G06F 3/0445 345/174 |
| 2015/0301393 A1* | 10/2015 | Liang | G06F 1/1637 349/12 |
| 2016/0212256 A1* | 7/2016 | Gan | H04N 5/2257 |
| 2016/0370927 A1* | 12/2016 | Fang | G06F 1/1616 |

* cited by examiner

ELECTRONIC DEVICE AND METHOD FOR CHANGING MODES VIA MULTIPLE DISPLAYS

RELATED APPLICATIONS

This application claims priority to China Application Serial Number 202110148216.2, filed Feb. 3, 2021, the disclosure of which is incorporated herein by reference in its entirety.

BACKGROUND

Technical Field

The present disclosure relates to an electronic device and method for controlling the same.

Description of Related Art

Most of the commercially available laptops adopt the traditional design of having a single keyboard alongside a single display. In recent years, novel applications, such as dual display, stereoscopic display and augmented reality (AR), have seen growth in popularity. However, no currently available device is capable of supporting all of the aforementioned novel applications.

SUMMARY

In view of the foregoing, one of the objects of the present disclosure is to provide a novel power supply device and conductive spring contact to resolve the aforementioned problem.

To achieve the objective stated above, in accordance with an embodiment of the present disclosure, an electronic device includes a first display panel, a second display panel and a processor. The first display panel is transparent and has a first display area. The second display panel has a second display area. The first display panel is movable with respect to the second display panel. The processor is electrically connected to the first display panel and the second display panel. The processor is configured to switch between a plurality of display modes based on relative positioning of the first display panel and the second display panel, and to provide video signals to the first display panel and the second display panel based on a current display mode. The processor is configured to execute a stereoscopic display mode when the first display panel is parallel to the second display panel and faces the second display area. The processor is configured to execute an augmented reality display mode when an angle between the first display panel and the second display panel is between 0 and 180 degrees, exclusive. The processor is configured to execute a dual display mode when the first display area of the first display panel and the second display area of the second display panel are oriented away from each other.

In one or more embodiments of the present disclosure, under the stereoscopic display mode, the first display panel is configured to display a first screen based on the video signals provided by the processor, and the second display panel is configured to display a second screen based on the video signals provided by the processor. The first screen includes a plurality of light blocking stripes and a plurality of transparent regions. The light blocking stripes and the transparent regions are arranged in an interleaved manner and extend in a direction. The second screen is partially exposed to a left eye of a user and is partially exposed to a right eye of the user through the transparent regions.

In one or more embodiments of the present disclosure, under the augmented reality display mode, the first display panel is configured to display one or more graphical items overlapped on an environmental background.

In one or more embodiments of the present disclosure, the second display panel is a touch display panel. Under the augmented reality display mode, the second display panel is configured to display an operating interface to be operated by a user to provide an input instruction signal, the processor is configured to receive the input instruction signal and to provide the video signals to the first display panel based on the input instruction signal.

In one or more embodiments of the present disclosure, under the dual display mode, the first display panel is configured to display a first user interface and the second display panel is configured to display a second user interface.

In one or more embodiments of the present disclosure, the first display panel is rotatably connected to the second display panel via a hinge. The first display panel is configured to rotate between a first position and a second position. When the first display panel is at the first position, the first display panel is parallel to the second display panel and faces the second display area. When the first display panel is at the second position, the first display area and the second display area are oriented away from each other.

In one or more embodiments of the present disclosure, the first display panel is a flexible display panel and is bendable to a first position and a second position. When the first display panel is at the first position, the first display panel is parallel to the second display panel and faces the second display area. When the first display panel is at the second position, the first display area and the second display area are oriented away from each other.

In one or more embodiments of the present disclosure, the electronic device further includes a stand. The stand is rotatably mounted on the second display panel and includes at least one first electrical contact. The second display panel includes at least one second electrical contact. The second electrical contact is located on a side of the second display panel away from the second display area. The first display panel is configured to be installed on the stand and connected to the first electrical contact, or the first display panel is configured to be installed on the side of the second display panel away from the second display area and connected to the second electrical contact.

In one or more embodiments of the present disclosure, the electronic device further includes an angle detector configured to provide an angle signal. The angle signal is indicative of an angle between the first display panel and the second display panel. The processor is electrically connected to the angle detector and is configured to switch between the display modes based on the angle signal.

In one or more embodiments of the present disclosure, the first display panel keeps a gap to the second display area when the first display panel rests on top of the second display panel.

In accordance with an embodiment of the present disclosure, an electronic device includes a first display panel, a second display panel, an input sensing component and a processor. The first display panel is a transparent display panel and is movable with respect to the second display panel. The input sensing component is configured to provide an operation signal in response to a user action. The processor is electrically connected to the input sensing component, the first display panel and the second display panel. The processor is configured to switch between a plurality of display modes based on the operation signal, and to provide video signals to the first display panel and the second display panel based on a current display mode. The display modes includes a stereoscopic display mode, an augmented reality display mode and a dual display mode.

In one or more embodiments of the present disclosure, the display modes further include a tablet mode. Under the tablet mode, the processor instructs one of the first and second display panels to turn on and the other to turn off.

In one or more embodiments of the present disclosure, the input sensing component includes a button, a touch sensing component or an eye tracking camera.

In accordance with an embodiment of the present disclosure, a method for controlling an electronic device is provided. The electronic device includes a processor, a first display panel which is transparent, and a second display panel. The first display panel is movable with respect to the second display panel. The processor is electrically connected to the first display panel and the second display panel. The method includes: (a) under a stereoscopic display mode, instructing, by the processor, the first display panel to display a plurality of light blocking stripes and a plurality of transparent regions, the light blocking stripes and the transparent regions being arranged in an interleaved manner and extending in a direction, and instructing, by the processor, the second display panel to display a screen, the screen being partially exposed to a left eye of a user and being partially exposed to a right eye of the user through the transparent regions; (b) under an augmented reality display mode, instructing, by the processor, the first display panel to display one or more graphical items overlapped on an environmental background; and (c) under a dual display mode, instructing, by the processor, the first display panel to display a first user interface, and instructing, by the processor, the second display panel to display a second user interface.

In one or more embodiments of the present disclosure, the electronic device further includes an angle detector electrically connected to the processor. The method further includes: (a) detecting, by the angle detector, an angle between the first display panel and the second display panel; and (b) switching between the stereoscopic display mode, the augmented reality display mode and the dual display mode, by the processor, based on the angle between the first display panel and the second display panel.

In one or more embodiments of the present disclosure, the electronic device further includes an input sensing component electrically connected to the processor. The method further includes: (a) providing, by the input sensing component, an operation signal in response to a user action; and (b) receiving, by the processor, the operation signal, and based on the operation signal, switching between the stereoscopic display mode, the augmented reality display mode and the dual display mode.

In sum, the electronic device of the present disclosure includes a transparent first display panel. Augmented reality display effect can be achieved by displaying graphical items on the first display panel, due to the transparency of the first display panel. The electronic device further includes a second display panel, such that the electronic device can provide dual-display function. Furthermore, when the first display panel overlays the display area of the second display panel, the first display panel may display a plurality of separated, light-blocking stripes. The second display panel may display two images in an interleaved manner to achieve stereoscopic display effect.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

FIG. 3 illustrates a schematic top view of the electronic device shown in

FIG. 1 being in the second operating state;

DETAILED DESCRIPTION

Figure 1:
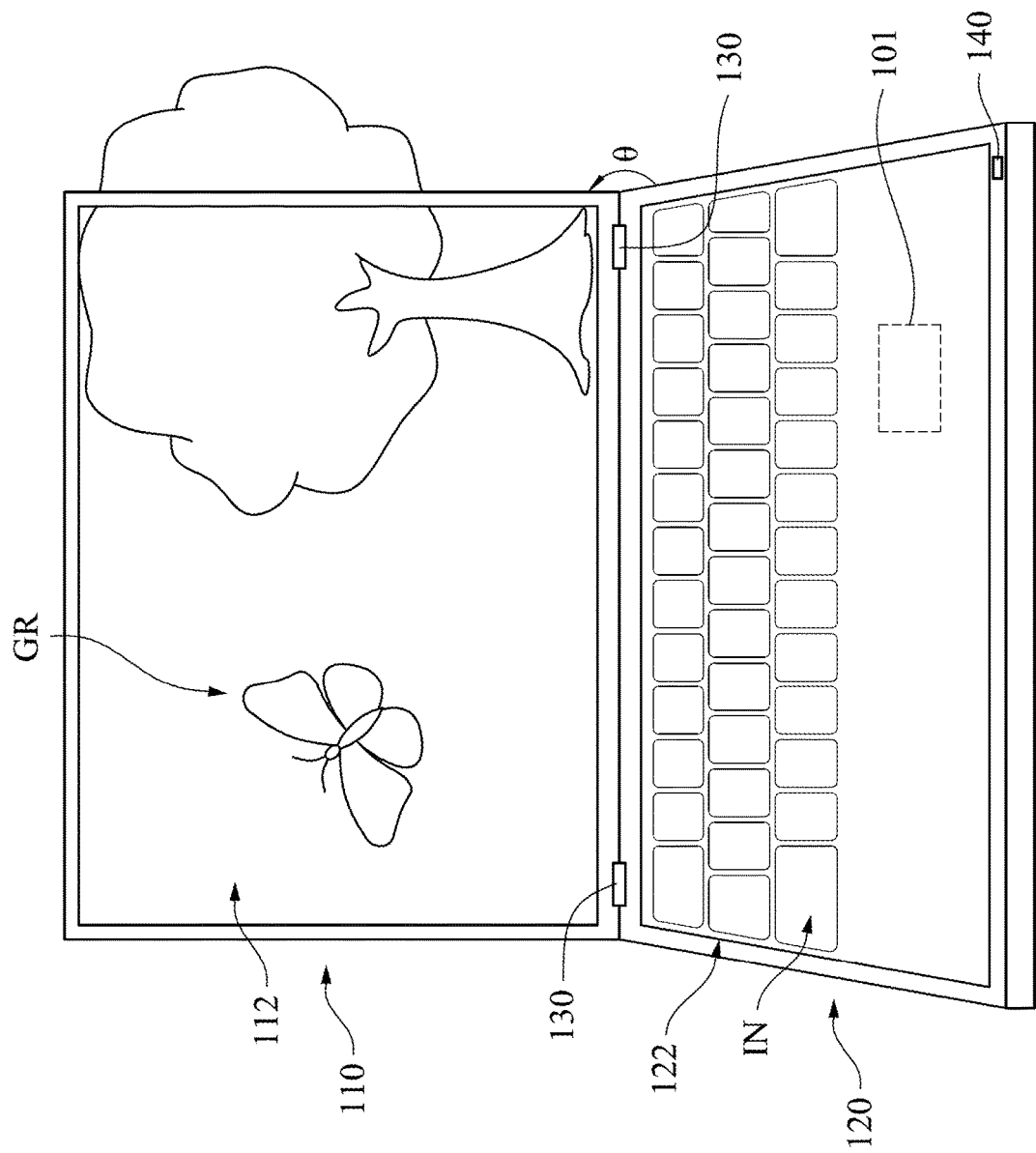
FIG. 1 illustrates a schematic front view of an electronic device in accordance with an embodiment of the present disclosure, wherein the electronic device is in a first operating state.

For the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Reference is made to FIG. 1, which illustrates a schematic front view of an electronic device 100 in accordance with an embodiment of the present disclosure, wherein the electronic device 100 is in a first operating state. The electronic device 100 includes a first display panel 110 and a second display panel 120 connected to the first display panel 110. The first display panel 110 is transparent (i.e., the first display panel 110 is a transparent display panel) and has a first display area 112. The second display panel 120 has a second display area 122.

In some embodiments, the first display panel 110 includes a transparent organic light emitting diode (OLED) display panel, a transparent micro light emitting diode (microLED) display panel, a transparent liquid crystal display (LCD)

panel or other types of transparent display panel. In some embodiments, the second display panel 120 includes LCD panel, OLED panel, microLED panel or other types of display panel.

As shown in FIG. 1, the first display panel 110 is movable with respect to the second display panel 120. In the present embodiment, the first display panel 110 is rotatably connected to the second display panel 120 via a hinge 130, such that the first display panel 110 can rotate with respect to the second display panel 120. In some embodiments, the hinge 130 provides the first display panel 110 with a 360-degree range of rotation. Specifically, the first display panel 110 is configured to rotate between a first position and a second position. When the first display panel 110 is at the first position, the first display panel 110 is parallel to the second display panel 120 and faces the second display area 122 (e.g., when an angle θ between the first display panel 110 and the second display panel 120 is substantially zero degrees). When the first display panel 110 is at the second position, the first display area 112 and the second display area 122 are oriented away from each other (e.g., when the angle θ between the first display panel 110 and the second display panel 120 is substantially 360 degrees).

As shown in FIG. 1, the electronic device 100 further includes a processor 101 (which is in the interior of the electronic device 100 and is thus shown in broken lines). The processor 101 is electrically connected to the first display panel 110 and the second display panel 120. The processor 101 is configured to switch between a plurality of display modes based on relative positioning of the first display panel 110 and the second display panel 120, and to separately provide video signals to the first display panel 110 and the second display panel 120 based on a current display mode. The first display panel 110 is configured to receive the video signals from the processor 101 and to display a first screen in the first display area 112 based on the received video signals. The second display panel 120 is configured to receive the video signals from the processor 101 and to display a second screen in the second display area 122 based on the received video signals. In other words, depending on the current display mode selected by the processor 101 from the plurality of display modes, the first display panel 110 and the second display panel 120 may change the contents displayed thereon accordingly. In some embodiments, the processor 101 includes a signal processing module.

As shown in FIG. 1, the processor 101 is configured to execute an augmented reality display mode when an angle θ between the first display panel 110 and the second display panel 120 is between 0 and 180 degrees, exclusive. Under the augmented reality display mode, the first display panel 110 is configured to display one or more graphical items GR overlapped on an environmental background (e.g., a tree). Specifically, since the first display panel 110 is transparent, a user of the electronic device 100 can see the environmental background through the first display panel 110. By displaying graphical items GR on the first display panel 110, augmented reality display effect can be achieved.

As shown in FIG. 1, in some embodiments, the second display panel 120 is a touch display panel. Under the augmented reality display mode, the second display panel 120 is configured to display an operating interface IN to be operated by the user to provide an input instruction signal. The processor 101 is configured to receive the input instruction signal and to provide video signals to the first display panel 110 based on the input instruction signal.

In some embodiments, the operating interface IN displayed by the second display panel 120 is an on-screen keyboard. When the user presses a button of the on-screen keyboard, the touch display panel provides the corresponding input instruction signal to the processor 101. The processor 101 provides video signals to the first display panel 110 based on the input instruction signal, such that the first display panel 110 can update the display content (e.g., showing the character represented by the button being pressed by the user).

As shown in FIG. 1, in some embodiments, the electronic device 100 further includes an angle detector 140 for detecting the angle θ between the first display panel 110 and the second display panel 120. In some embodiments, the angle detector 140 is configured to provide an angle signal. The angle signal is indicative of the angle θ between the first display panel 110 and the second display panel 120. In some embodiments, the angle detector 140 is disposed on a bezel of the first display panel 110, on a bezel of the second display panel 120, or on the hinge 130. In some embodiments, the angle detector 140 includes a Hall effector sensor.

Continuing the discussion in the previous paragraph, the processor 101 is electrically connected to the angle detector 140 and is configured to receive the angle signal provided by the angle detector 140. The processor 101 is further configured to switch between the display modes based on the angle signal. In some embodiments, when the angle signal indicates that the angle θ between the first display panel 110 and the second display panel 120 is between 0 and 180 degrees, exclusive, the processor 101 switches to the augmented reality display mode and instructs the first display panel 110 to display one or more graphical items GR overlapped on the environmental background.

Figure 2:
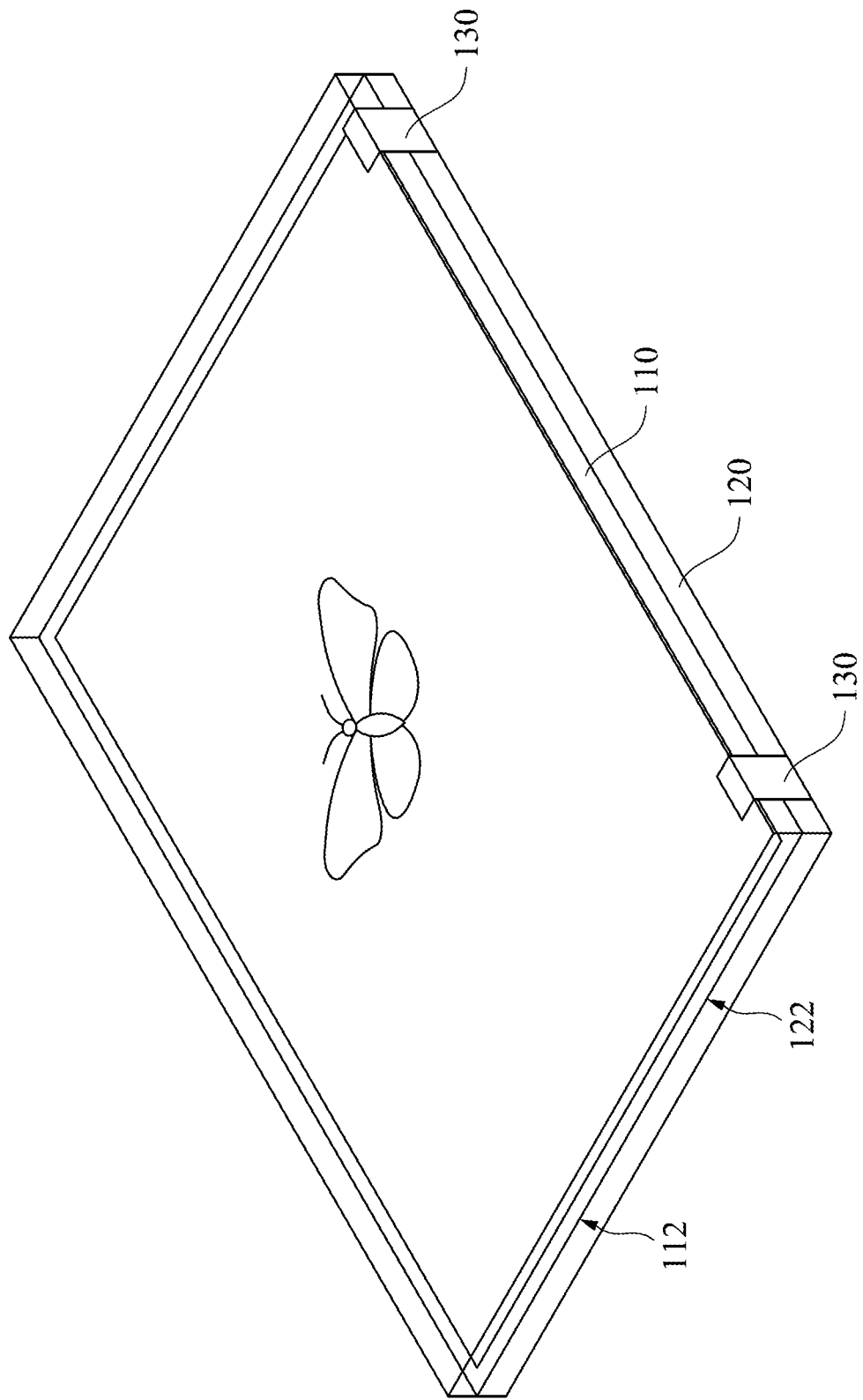
FIG. 2 illustrates a schematic perspective view of the electronic device shown in FIG. 1 being in a second operating state.
Figure 3:
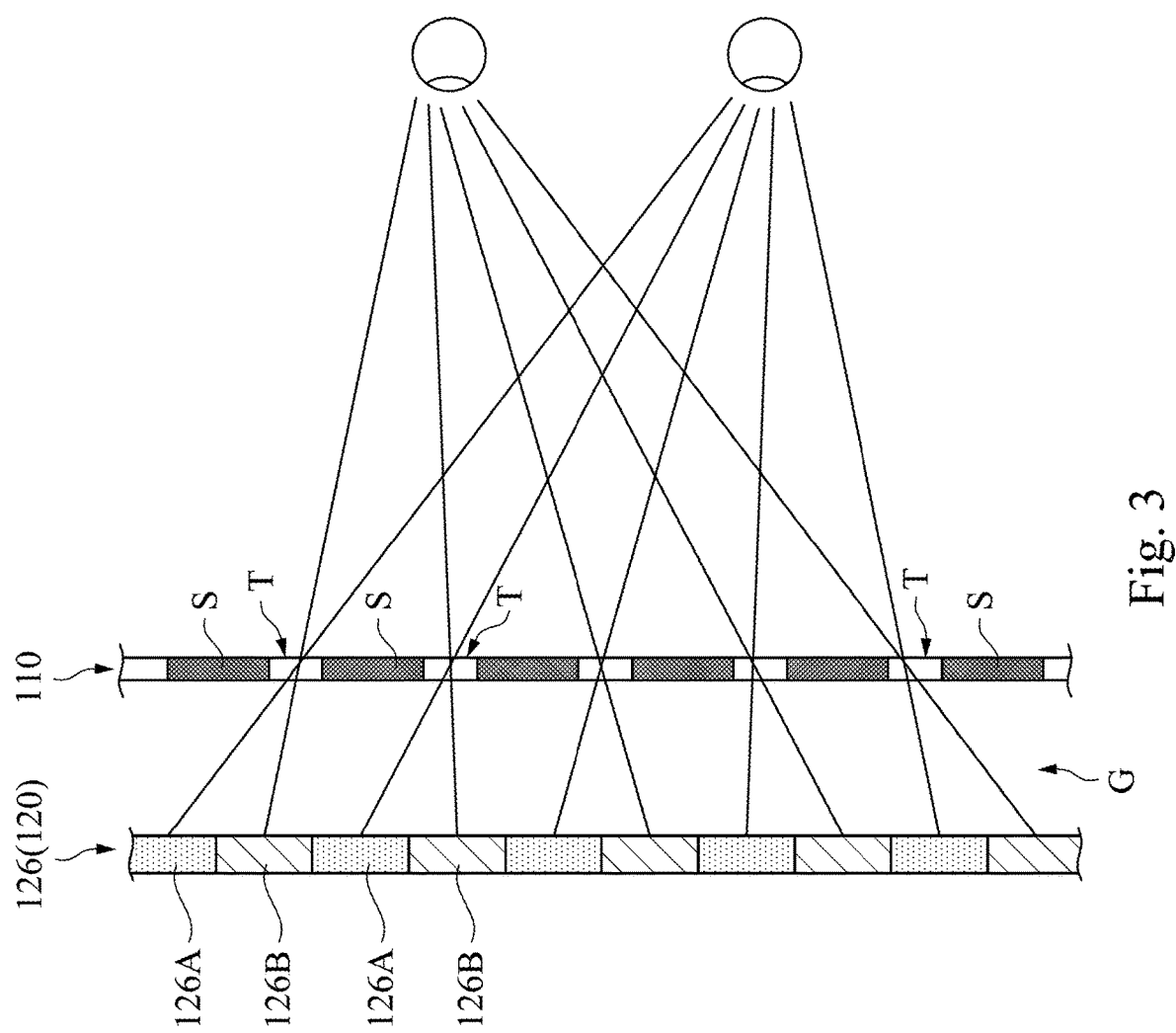

Reference is made to FIGS. 2 and 3. FIG. 2 illustrates a schematic perspective view of the electronic device 100 shown in FIG. 1 being in a second operating state. FIG. 3 illustrates a schematic top view of the electronic device 100 shown in FIG. 1 being in a second operating state. The processor 101 is configured to execute a stereoscopic display mode when the first display panel 110 is parallel to the second display panel 120 and faces the second display area 122 (e.g., when the angle θ between the first display panel 110 and the second display panel 120 is substantially zero degrees). Under the stereoscopic display mode, the first screen displayed by the first display panel includes a plurality of light blocking stripes S and a plurality of transparent regions T. The light blocking stripes S and the transparent regions T are arranged in an interleaved manner and extend in a direction (e.g., extend in the direction normal to the plane of the screen in FIG. 3). The second screen display by the second display panel 120 is partially exposed to a left eye of the user and is partially exposed to a right eye of the user through the transparent regions T.

As shown in FIG. 3, specifically, the second display panel 120 includes a pixel array 126. The pixel array 126 includes a plurality of first subarrays 126A and a plurality of second subarrays 126B (e.g., each of the first subarrays 126A and the second subarrays 126B includes a column of pixels). The first subarrays 126A and the second subarrays 126B are arranged in an interleaved manner. The first subarrays 126A are configured to display an image (e.g., a left-eye image), and the second subarrays 126B are configured to display another image (e.g., a right-eye image).

As shown in FIG. 3, the light blocking stripes S may be opaque black stripes. Since the first display panel 110 is transparent, the transparent region T between any two immediately adjacent light blocking stripes S allows light to pass through. In other words, the first display panel 110 forms a parallax barrier. As a result, when the user uses the electronic device 100 with the first display panel 110 positioned to face the second display area 122 and with the stereoscopic display mode activated, the left and right eyes of the user can see images corresponding to different view angles, thereby giving the user the perception of a 3D image.

As shown in FIG. 3, in some embodiments, the first display panel 110 keeps a gap G to the second display area 122 when the first display panel 110 rest on top of the second display panel 120 (e.g., when the angle θ between the first display panel 110 and the second display panel 120 is substantially zero degrees). Introducing a gap G of suitable width can restrict the pixels viewable by the left eye of the user to the first subarrays 126A and restrict the pixels viewable by the right eye of the user to the second subarrays 126B. In other words, the left eye of the user can only receive light emitted by the first subarrays 126A and can thus only see the image displayed by the first subarrays 126A. Similarly, the right eye of the user can only receive light emitted by the second subarrays 126B and can thus only see the image displayed by the second subarrays 126B. In some embodiments, the width of the gap G is substantially 0.5 cm to provide desirable stereoscopic display effect.

In some embodiments, the processor 101 is configured to receive the angle signal from the angle detector 140, and when the angle signal indicates that the angle θ between the first display panel 110 and the second display panel 120 is substantially zero degrees, the processor 101 switches to the stereoscopic display mode, instructs the first display panel 110 to display the light blocking stripes S and the transparent regions T in an interleaved manner, and instructs the second display panel 120 to display the second screen, which is partially exposed to the left eye of the user and is partially exposed to the right eye of the user through the transparent regions T.

Figure 4:
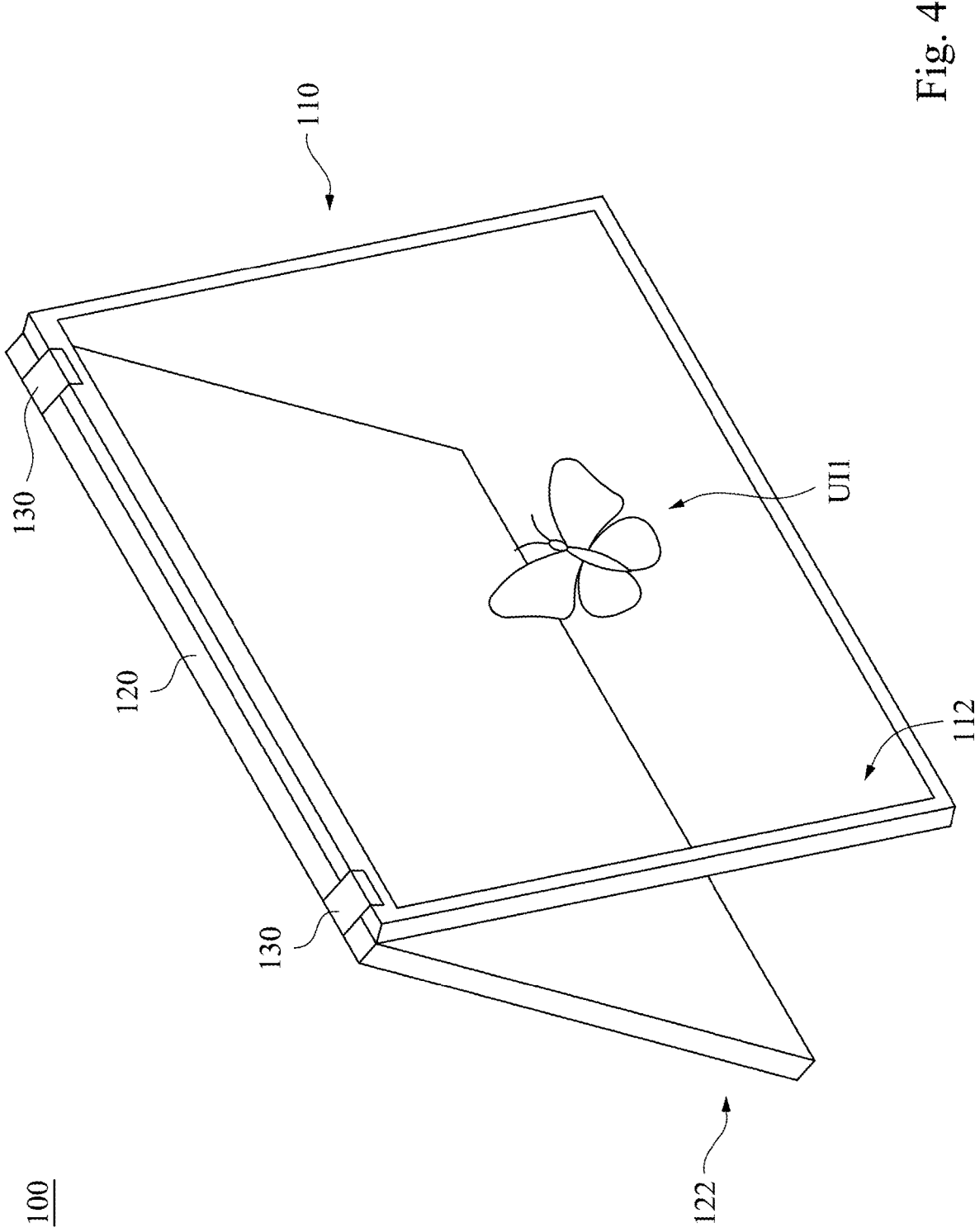
FIGS. 4 and 5 illustrate schematic perspective views of the electronic device shown in FIG. 1 being in a third operating state.
Figure 5:
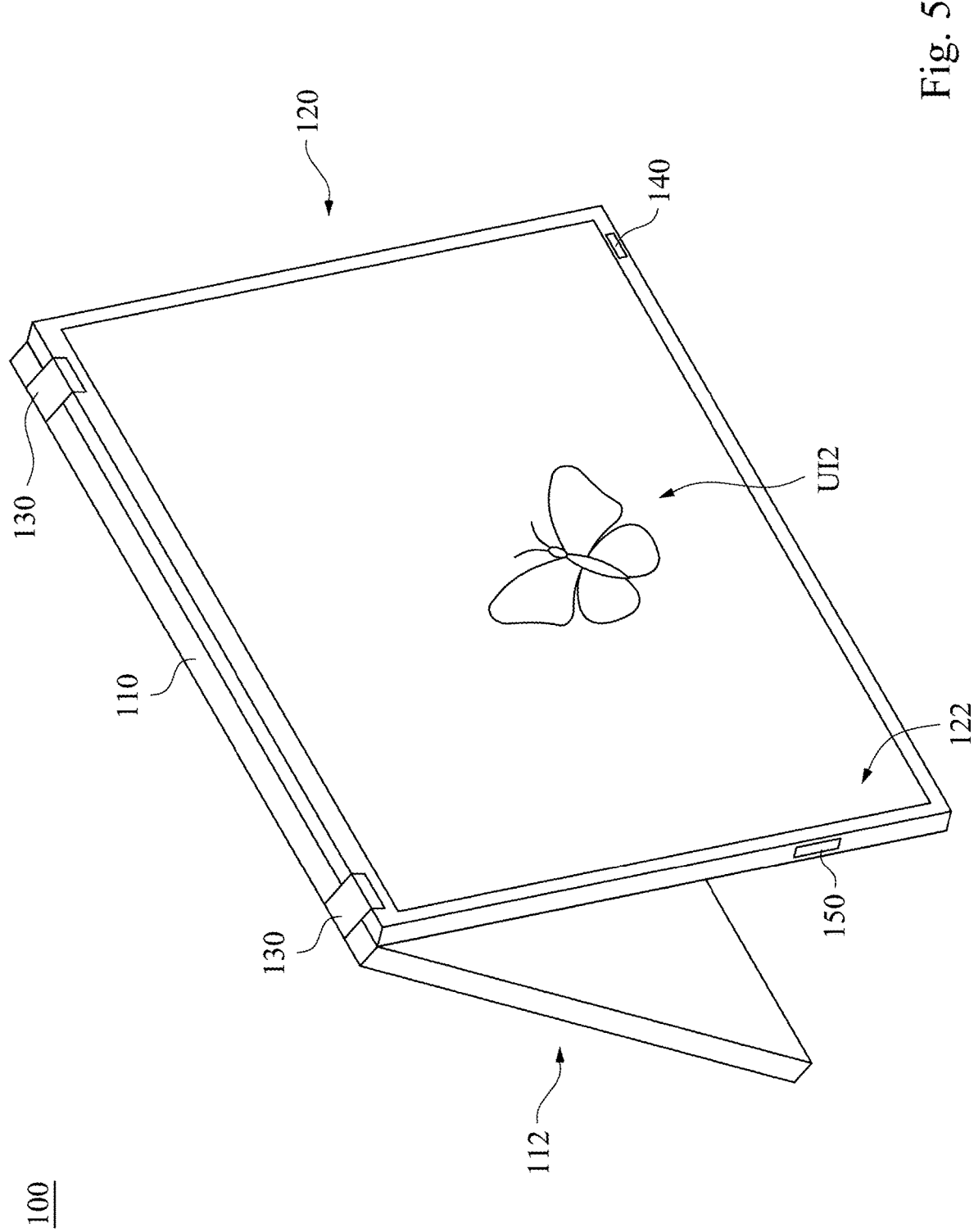

Reference is made to FIGS. 4 and 5, which illustrate schematic perspective views of the electronic device 100 shown in FIG. 1 being in a third operating state. The processor is configured to execute a dual display mode when the first display area 112 of the first display panel 110 and the second display area 122 of the second display panel 120 are oriented away from each other (e.g., when the first display panel 110 is rotated to a side of the second display panel 120 away from the second display area 122). Under the dual display mode, the first display panel 110 is configured to display a first user interface UI1 and the second display panel 120 is configured to display a second user interface UI2. The electronic device 100 operating under the dual display mode allows two users to share the electronic device 100. One user can use the first display panel 110 and the other user can use the second display panel 120.

In some embodiments, the processor 101 is configured to receive the angle signal from the angle detector 140, and when the angle signal indicates that the angle θ between the first display panel 110 and the second display panel 120 is greater than 180 degrees and does not exceed 360 degrees, the processor 101 switches to the dual display mode and instructs the first display panel 110 and the second display panel 120 to display the first user interface UI1 and the second user interface UI2 respectively.

Aside from switching between the display modes based on relative positioning of the first display panel 110 and the second display panel 120, in an alternative embodiment, the electronic device 100 includes at least one input sensing component 150 to be operated by the user to switch display mode. By this arrangement, the user can decide when to switch to each display mode by himself/herself.

Depending on the application scenario, the electronic device 100 may be equipped with either one of the angle detector 140 and the input sensing component 150, or both of the angle detector 140 and the input sensing component 150. In embodiments where the electronic device 100 includes both the angle detector 140 and the input sensing component 150, the electronic device 100 may provide user settings to allow the user to disable the angle detector 140 and enable the input sensing component 150, such that the user can manually select display mode for the electronic device 100, or to enable the angle detector 140 and disable the input sensing component 150, such that the processor 101 can automatically select display mode based on the angle signal provided by the angle detector 140.

As shown in FIG. 5, specifically, the input sensing component 150 is configured to provide an operation signal in response to a user action. The processor 101 is electrically connected to the input sensing component 150 and is configured to switch between the stereoscopic display mode, the augmented reality display mode and the dual display mode based on the operation signal. The processor 101 is further configured to provide video signals to the first display panel 110 and the second display panel 120 based on a current display mode, such that the first display panel 110 and the second display panel 120 can show different outputs for different display modes.

In some embodiments, the input sensing component 150 is a button. The button is configured to provide an operation signal in response to a pressing action of the user. In some embodiments, the input sensing component 150 is a touch sensing component. The touch sensing component is configured to provide an operation signal in response to a touch action or a gesture of the user. In some embodiments, the input sensing component 150 is eye tracking camera. The eye tracking camera is configured to provide an operation signal based on the positions or the movements of the user's eyes. In FIG. 5, the input sensing component 150 is positioned on a side surface of the second display panel 120. However, this is merely an example. Depending on the type of the input sensing component 150 and/or other application requirements, the input sensing component 150 may alternatively be disposed on the first display panel 110, or be disposed at other suitable locations on the second display panel 120.

In some embodiments, the processor 101 is further configured to execute a tablet mode based on the operation signal provided by the input sensing component 150. Under the tablet mode, the processor 101 instructs one of the first and second display panels 110 and 120 to turn on and the other to turn off. When only one user is operating the electronic device 100 and the user does not need to run two application programs simultaneously, executing the tablet mode to turn off one of the display panels (i.e., turning off the first display panel 110 or the second display panel 120) can reduce the power consumption of the electronic device 100.

Figure 6:
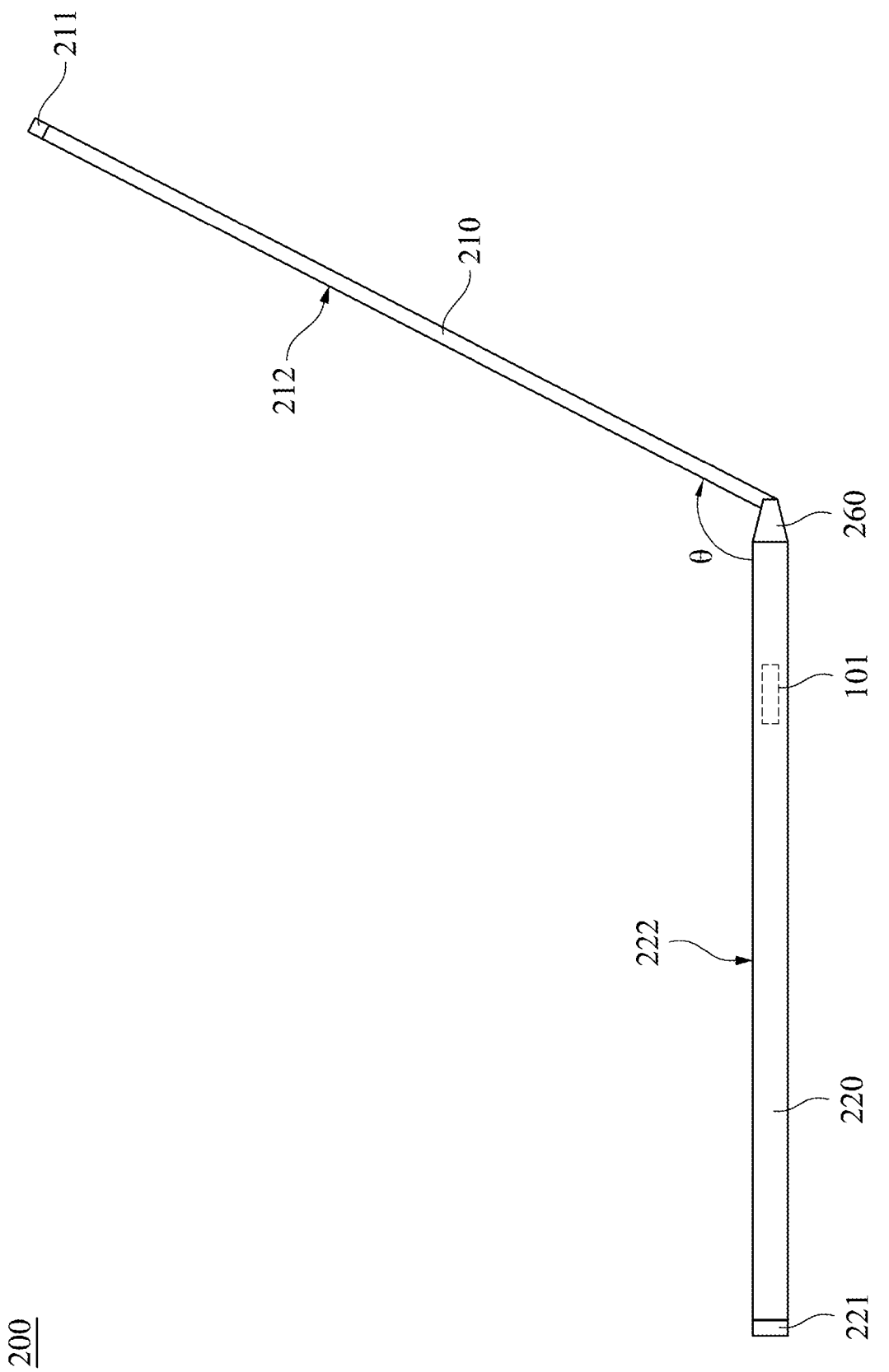
FIGS. 6 to 8 illustrate schematic side views of an electronic device in accordance with another embodiment of the present disclosure.
Figure 7:
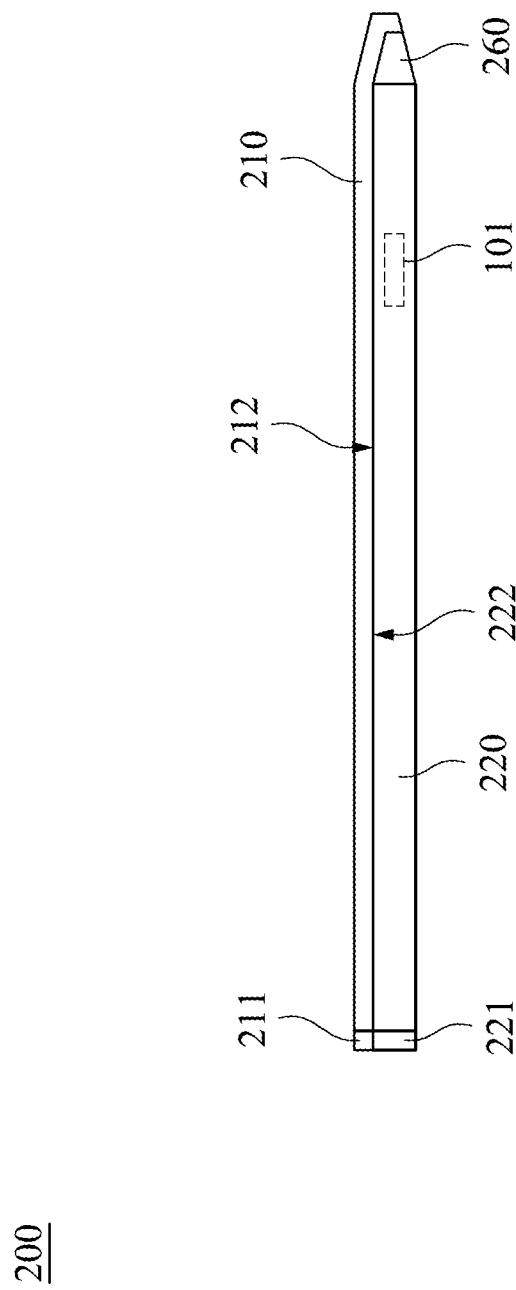
Figure 8:
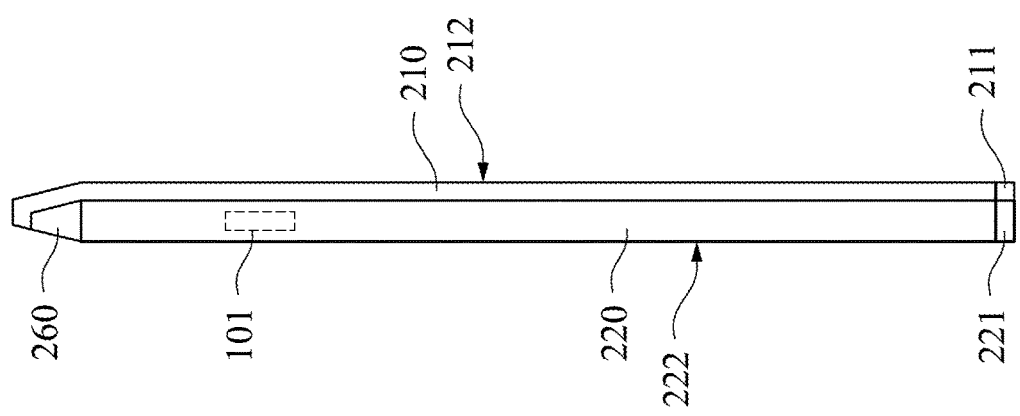

Reference is made to FIGS. 6 to 8, which illustrate schematic side views of an electronic device 200 in accordance with another embodiment of the present disclosure. The present embodiment differs from the embodiment discussed previously in that the first display panel 210 is a flexible, transparent display panel (e.g., a flexible, transparent OLED display panel). The flexibility of the first display panel 210 enables the first display panel 210 to change its relative position to the second display panel 220.

Specifically, the first display panel 210 is bendable to a first position and a second position. When the first display panel 210 is at the first position (e.g., the position of the first display panel 210 in FIG. 7), the first display panel 210 is parallel to the second display panel 220 and faces the second display area 222. When the first display panel 210 is at the second position (e.g., the position of the first display panel 210 in FIG. 8), the first display area 212 of the first display panel 210 and the second display area 222 of the second display panel 220 are oriented away from each other.

As shown in FIG. 6, in some embodiments, the processor 101 is configured to execute the augmented reality display mode when the angle θ between the first display panel 210 and the second display panel 220 is between 0 and 180 degrees, exclusive. As shown in FIG. 7, in some embodiments, the processor 101 is configured to execute the stereoscopic display mode when the first display panel 210 is bent to the first position. As shown in FIG. 8, in some embodiments, the processor 101 is configured to execute the dual display mode when the first display panel 210 is bent to the second position.

In some embodiments, the electronic device 200 includes either or both of an angle detector and an input sensing component (not depicted). The angle detector and the input sensing component of the electronic device 200 will not be discussed in further detail since they function similar to the angle detector 140 and the input sensing component 150 of the electronic device 100, respectively.

As shown in FIGS. 6 to 8, in some embodiments, the electronic device 200 further includes a container 260 disposed along an edge of the second display panel 220. The first display panel 210 may be rolled and housed in the container 260. In some embodiments, the first display panel 210 includes a connecting structure 211, and the second display panel 220 includes a retaining structure 221 positioned corresponding to the connecting structure 211. The retaining structure 221 is configured to be fixedly connected with the connecting structure 211 to hold the first display panel 210 at the first position or the second position.

In some embodiments, one of the connecting structure 211 and the retaining structure 221 is a magnet and the other is made of magnetic material attracted to magnets (e.g., ferromagnetic material). In such embodiments, the connecting structure 211 and the retaining structure 221 can be fixedly combined by magnetic force. In some embodiments, the connecting structure 211 and the retaining structure 221 include snap features, such that the connecting structure 211 and the retaining structure 221 can be fixedly interlocked.

Figure 9:
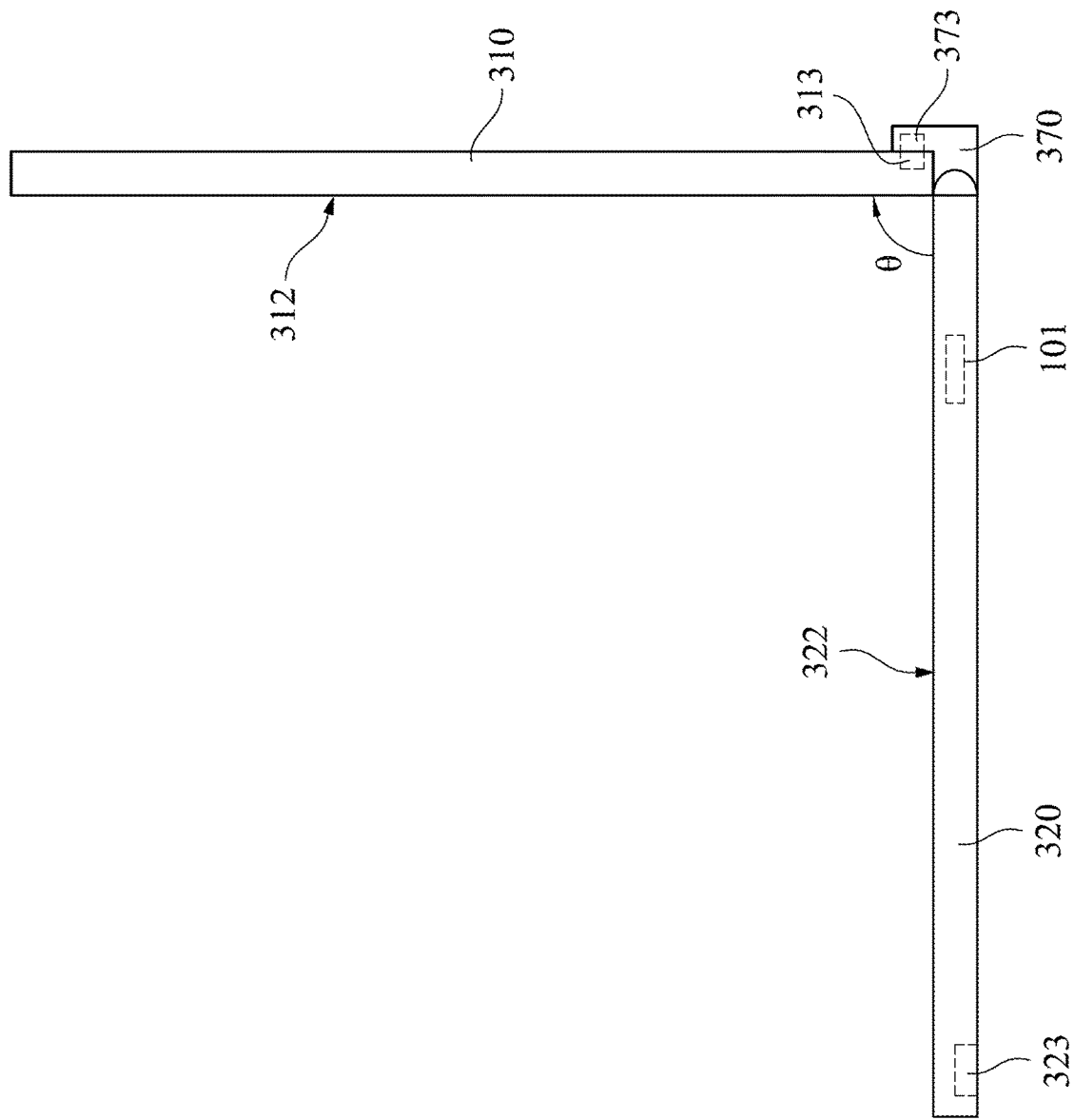
FIGS. 9 to 11 illustrate schematic side views of an electronic device in accordance with another embodiment of the present disclosure.
Figure 10:
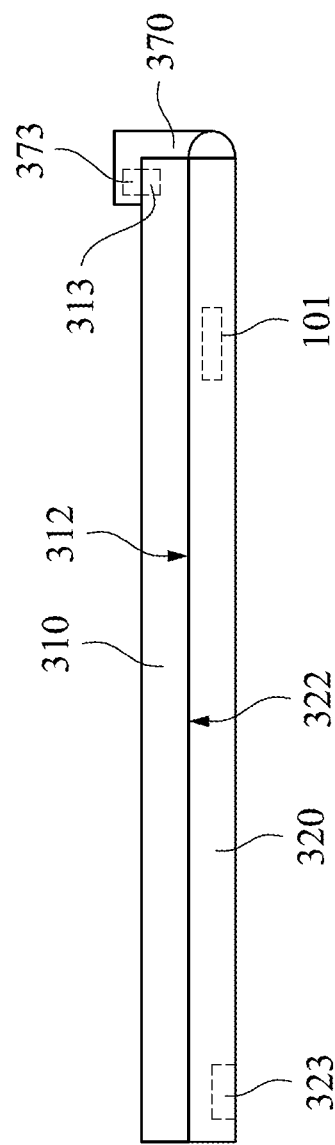
Figure 11:
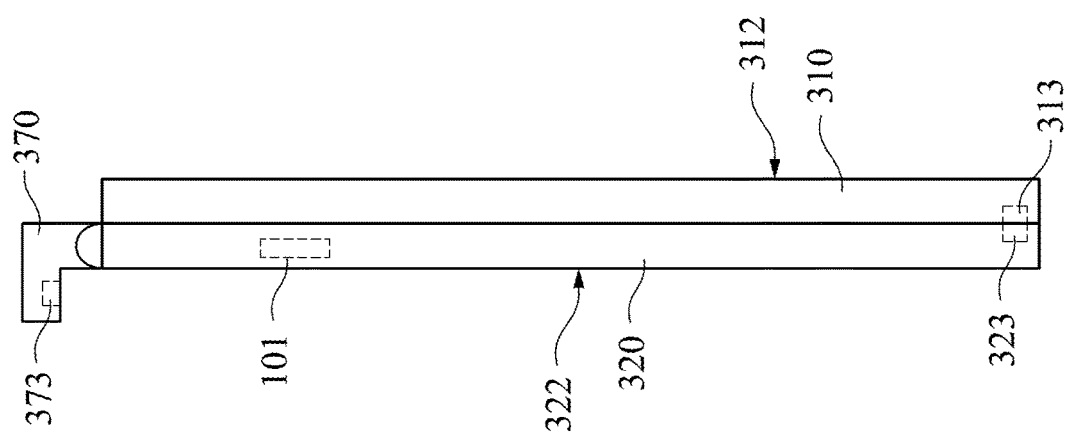

Reference is made to FIGS. 9 to 11, which illustrate schematic side views of an electronic device 300 in accordance with another embodiment of the present disclosure. The present embodiment differs from the embodiments discussed previously in that the first display panel 310 is not only transparent but also detachable, enabling the first display panel 310 to change its relative position to the second display panel 320.

As shown in FIGS. 9 to 11, specifically, the electronic device 300 further includes a stand 370 rotatably mounted on the second display panel 320. The stand 370 is configured to support and to connect the first display panel 310. When the first display panel 310 is installed on the stand 370, the first display panel 310 can rotate with the stand 370. The stand 370 includes at least one first electrical contact 371 electrically connected to the processor 101. When the first display panel 310 is installed on the stand 370, the first display panel 310 is connected to the first electrical contact 371, such that the first display panel 310 can receive video signals from the processor 101.

In some embodiments, the first display panel 310 includes a connection interface 311 (e.g., one or more electrical contacts) to be connected with the first electrical contact 371 of the stand 370. The connection interface 311 and the first display area 312 are located on opposite sides of the first display panel 310. In some embodiments, the stand 370 may include structure such as magnets or snap features (not depicted) to hold the first display panel 310.

As shown in FIG. 9, in some embodiments, the processor 101 is configured to execute the augmented reality display mode when the first display panel 310 is installed on the stand 370 and the angle θ between the first display panel 310 and the second display panel 320 is between 0 and 180 degrees, exclusive.

As shown in FIG. 10, in some embodiments, the processor 101 is configured to execute the stereoscopic display mode when the first display panel 310 is installed on the stand 370 and is rotated to the first position (e.g., when the first display panel 310 is parallel to the second display panel 320 and faces the second display area 322, or when the angle θ between the first display panel 310 and the second display panel 320 is substantially zero degrees).

In some embodiments, the electronic device 300 includes either or both of an angle detector and an input sensing component (not depicted). The angle detector and the input sensing component of the electronic device 300 will not be discussed in further detail since they function similar to the angle detector 140 and the input sensing component 150 of the electronic device 100, respectively.

As shown in FIG. 11, the second display panel 320 further includes at least one second electrical contact 321 electrically connected to the processor 101. The second electrical contact 321 and the second display area 322 are located on opposite sides of the second display panel 320. Having the second electrical contact 321 mounted thereon, the rear side of the second display panel 320 (i.e., the side of the second display panel 320 away from the second display area 322) may serve as a second mounting position for the first display panel 310.

Specifically, the user may install the first display panel 130 on the rear side of the second display panel 320, and connecting the connection interface 311 of the first display panel 310 to the second electrical contact 321 of the second display panel 320. The first display area 312 of the first display panel 310 and the second display area 322 of the second display panel 320 would be oriented away from each other in said configuration, enabling the execution of the dual display mode.

In some embodiments, the electronic device 300 is configured to detect if the first display panel 310 is connected to the second electrical contact 321. When it is detected that the first display panel 310 is connected to the second electrical contact 321, the processor 101 switches to the dual display mode. In some embodiments, the second display panel 320 may include structure such as magnets or snap features (not depicted) on its rear side to hold the first display panel 310.

Figure 12:
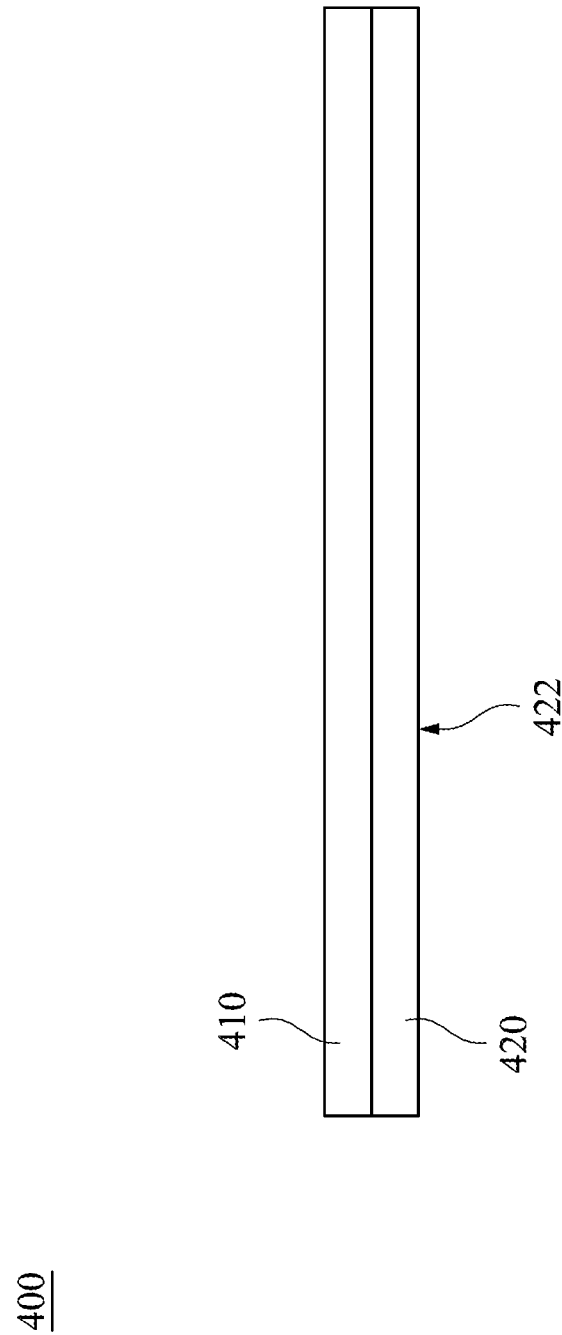
FIG. 12 illustrates a schematic side view of an electronic device in accordance with another embodiment of the present disclosure.

Reference is made to FIG. 12, which illustrates a schematic side view of an electronic device 400 in accordance with another embodiment of the present disclosure. The electronic device 400 includes a first display panel 410 and a second display panel 420. The first display panel 410 is a transparent OLED display panel. The second display panel 420 has a second display area 422. When the first display panel 410 is in a stack arrangement with the second display panel 420 and is located on a side of the second display panel 420 away from the second display area 422, the first display panel 410 is deactivated (e.g., by a processor of the electronic device 400) and becomes entirely transparent. When the first display panel 410 is deactivated, all pixel units of the first display panel 410 are turned off. Deactivating the first display panel 410 enables environmental light source, such as sunlight or indoor/outdoor lightings, to pass through the first display panel 410 to provide backlight for the second display panel 420, enabling the second display panel 420 to output image.

Figure 13:
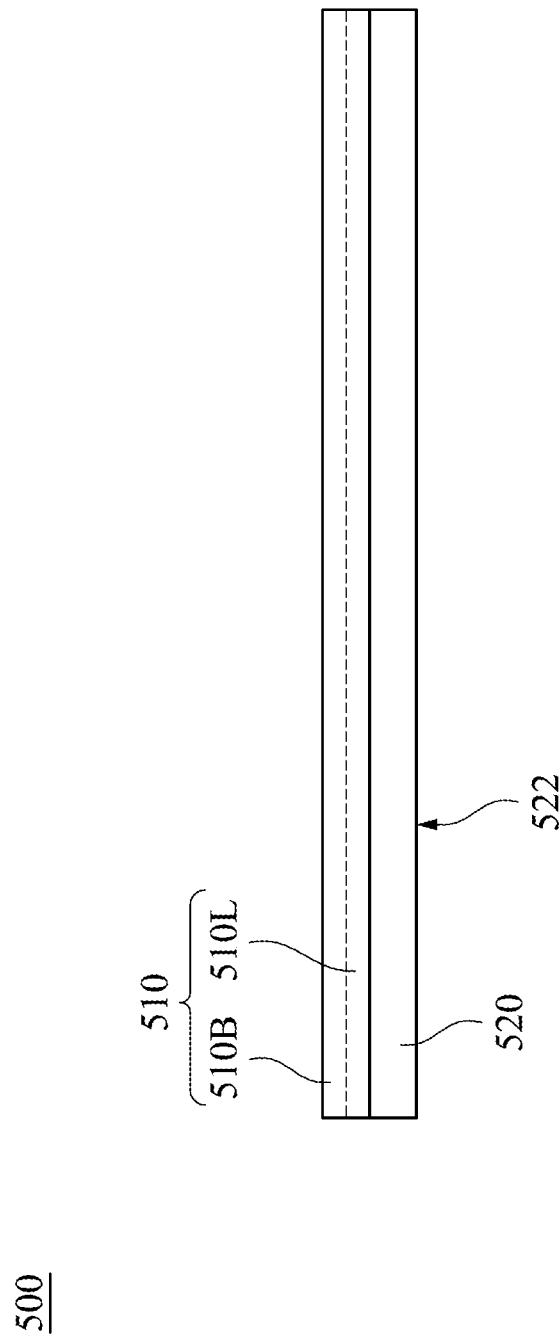
FIG. 13 illustrates a schematic side view of an electronic device in accordance with another embodiment of the present disclosure.

Reference is made to FIG. 13, which illustrates a schematic side view of an electronic device 500 in accordance with another embodiment of the present disclosure. The electronic device 500 includes a first display panel 510 and a second display panel 520. The first display panel 510 is a transparent LCD display panel and includes a first backlight module 510B and a first liquid crystal module 510L. When the first display panel 510 is in a stack arrangement with the second display panel 520 and the first backlight module 510B is located on a side of the first display panel 510 away from the second display panel 520, the first display panel 510 is deactivated (i.e., does not apply voltage to rotate the liquid crystals in the first liquid crystal module 510L) and becomes entirely transparent, and the first backlight module 510B is configured to emit light to provide backlight for the second display panel 520, so that the second display area 522 of the second display panel 520 can output image.

Figure 14:
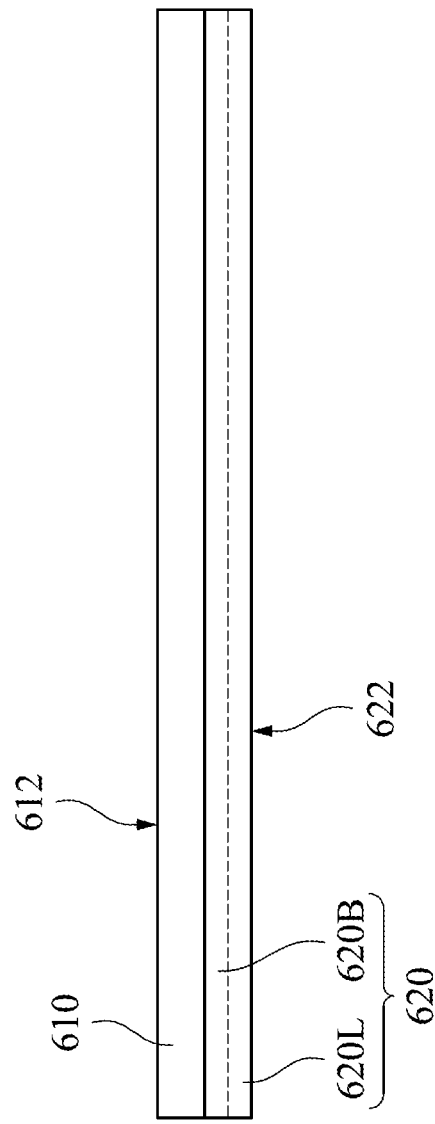
FIG. 14 illustrates a schematic side view of an electronic device in accordance with another embodiment of the present disclosure.

Reference is made to FIG. 14, which illustrates a schematic side view of an electronic device 600 in accordance with another embodiment of the present disclosure. The electronic device 600 includes a first display panel 610 and a second display panel 620. The second display panel 620 is an LCD display panel and includes a second backlight module 620B and a second liquid crystal module 620L. When the first display panel 610 is in a stack arrangement with the second display panel 620, with the first display area 612 of the first display panel 610 facing away from the second display panel 620, and the second backlight module 620B is located between the first display panel 610 and the second liquid crystal module 620L, the electronic device 600 switches to the dual display mode. Under the dual display mode, the second backlight module 620B is configured to emit light to provide backlight for the second liquid crystal module 620L, enabling the second display area 622 of the second display panel 620 to display a screen. In the meantime, the first display area 612 of the first display panel 610 can independently display another screen.

In sum, the electronic device of the present disclosure includes a transparent first display panel. Augmented reality display effect can be achieved by displaying graphical items on the first display panel, due to the transparency of the first display panel. The electronic device further includes a second display panel, such that the electronic device can provide dual-display function. Furthermore, when the first display panel overlays the display area of the second display panel, the first display panel may display a plurality of separated, light-blocking stripes. The second display panel may display two images in an interleaved manner to achieve stereoscopic display effect.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. An electronic device, comprising:
a first display panel which is transparent and has a first display area;
a second display panel having a second display area, wherein the first display panel is movable with respect to the second display panel;
a stand rotatably mounted on the second display panel and comprising at least one first electrical contact, wherein the second display panel comprises at least one second electrical contact, the second electrical contact is located on a side of the second display panel away from the second display area, wherein the first display panel is configured to be installed on the stand and connected to the first electrical contact, or the first display panel is configured to be installed on the side of the second display panel away from the second display area and connected to the second electrical contact; and
a processor electrically connected to the first display panel and the second display panel, the processor being configured to switch between a plurality of display modes based on relative positioning of the first display panel and the second display panel, and to provide video signals to the first display panel and the second display panel based on a current display mode;
wherein the processor is configured to execute a stereoscopic display mode when the first display panel is parallel to the second display panel and faces the second display area;
wherein the processor is configured to execute an augmented reality display mode when an angle between the first display panel and the second display panel is between 0 and 180 degrees, exclusive of 0 degrees and 180 degrees;
wherein the processor is configured to execute a dual display mode when the first display area of the first display panel and the second display area of the second display panel are oriented away from each other.

2. The electronic device of claim 1, wherein under the stereoscopic display mode, the first display panel is configured to display a first screen based on the video signals provided by the processor, the first screen comprises a plurality of light blocking stripes and a plurality of transparent regions, the light blocking stripes and the transparent regions are arranged in an interleaved manner and extend in a direction, the second display panel is configured to display a second screen based on the video signals provided by the processor, the second screen is partially exposed to a left eye of a user and is partially exposed to a right eye of the user through the transparent regions.

3. The electronic device of claim 1, wherein under the augmented reality display mode, the first display panel is configured to display one or more graphical items overlapped on an environmental background.

4. The electronic device of claim 3, wherein the second display panel is a touch display panel, under the augmented reality display mode, the second display panel is configured to display an operating interface to be operated by a user to provide an input instruction signal, the processor is configured to receive the input instruction signal and to provide the video signals to the first display panel based on the input instruction signal.

5. The electronic device of claim 1, wherein under the dual display mode, the first display panel is configured to display a first user interface and the second display panel is configured to display a second user interface.

6. The electronic device of claim 1, further comprising:
an angle detector configured to provide an angle signal, the angle signal being indicative of an angle between the first display panel and the second display panel, wherein the processor is electrically connected to the angle detector and is configured to switch between the display modes based on the angle signal.

7. The electronic device of claim 1, wherein the first display panel keeps a gap to the second display area when the first display panel rests on top of the second display panel.

8. An electronic device, comprising:
a first display panel which is a transparent display panel;
a second display panel, wherein the first display panel is movable with respect to the second display panel;
a stand rotatably mounted on the second display panel and comprising at least one first electrical contact, wherein the second display panel has a display area and at least one second electrical contact, the second electrical contact and the display area are located on opposite sides of the second display panel, wherein the first display panel is configured to be installed on the stand and connected to the first electrical contact, or the first display panel is configured to be installed on a side of the second display panel away from the display area and connected to the second electrical contact;
an input sensing component configured to provide an operation signal in response to a user action; and
a processor electrically connected to the input sensing component, the first display panel and the second display panel, the processor being configured to switch between a plurality of display modes based on the operation signal, and to provide video signals to the first display panel and the second display panel based on a current display mode, wherein the display modes comprise a stereoscopic display mode, an augmented reality display mode and a dual display mode.

9. The electronic device of claim 8, wherein under the stereoscopic display mode, the first display panel is configured to display a first screen based on the video signals provided by the processor, the first screen comprises a plurality of light blocking stripes and a plurality of transparent regions, the light blocking stripes and the transparent regions are arranged in an interleaved manner and extend in a direction, the second display panel is configured to display a second screen based on the video signals provided by the processor, the second screen is partially exposed to a left eye of a user and is partially exposed to a right eye of the user through the transparent regions.

10. The electronic device of claim 8, wherein under the augmented reality display mode, the first display panel is configured to display one or more graphical items overlapped on an environmental background.

11. The electronic device of claim 10, wherein the second display panel is a touch display panel, under the augmented reality display mode, the second display panel is configured to display an operating interface to be operated by a user to provide an input instruction signal, the processor is configured to receive the input instruction signal and to provide the video signals to the first display panel based on the input instruction signal.

12. The electronic device of claim 8, wherein under the dual display mode, the first display panel is configured to display a first user interface and the second display panel is configured to display a second user interface.

13. The electronic device of claim 8, wherein the display modes further comprise a tablet mode, under the tablet mode, the processor instructs one of the first and second display panels to turn on and the other to turn off.

14. The electronic device of claim 8, wherein the input sensing component comprises a button, a touch sensing component or an eye tracking camera.

15. A method for controlling an electronic device, the electronic device comprising a processor, a stand, a first display panel which is transparent, and a second display panel, the first display panel being movable with respect to the second display panel, the processor being electrically connected to the first display panel and the second display panel, the stand being rotatably mounted on the second display panel and comprising at least one first electrical contact, the second display panel having a display area and at least one second electrical contact, the second electrical contact and the display area being located on opposite sides of the second display panel, the first display panel being configured to be installed on the stand and connected to the first electrical contact, or being configured to be installed on a side of the second display panel away from the display area and connected to the second electrical contact, the method comprising:
under a stereoscopic display mode, instructing, by the processor, the first display panel to display a plurality of light blocking stripes and a plurality of transparent regions, the light blocking stripes and the transparent regions being arranged in an interleaved manner and extending in a direction, and instructing, by the processor, the second display panel to display a screen, the screen being partially exposed to a left eye of a user and being partially exposed to a right eye of the user through the transparent regions;
under an augmented reality display mode, instructing, by the processor, the first display panel to display one or more graphical items overlapped on an environmental background; and
under a dual display mode, instructing, by the processor, the first display panel to display a first user interface, and instructing, by the processor, the second display panel to display a second user interface.

16. The method of claim 15, wherein the electronic device further comprises an angle detector electrically connected to the processor, and the method further comprises:
detecting, by the angle detector, an angle between the first display panel and the second display panel; and
switching between the stereoscopic display mode, the augmented reality display mode and the dual display mode, by the processor, based on the angle between the first display panel and the second display panel.

17. The method of claim 15, wherein the electronic device further comprises an input sensing component electrically connected to the processor, and the method further comprises:
providing, by the input sensing component, an operation signal in response to a user action; and
receiving, by the processor, the operation signal, and based on the operation signal, switching between the stereoscopic display mode, the augmented reality display mode and the dual display mode.

* * * * *